United States Patent [19]
Bertozzi

[11] 4,192,941
[45] Mar. 11, 1980

[54] CURED POLYSULFIDE POLYMERS SUITABLE FOR HOT MELT APPLICATIONS

[75] Inventor: Eugene R. Bertozzi, Yardley, Pa.

[73] Assignee: Thiokol Corporation, Newtown, Pa.

[21] Appl. No.: 913,630

[22] Filed: Jun. 8, 1978

[51] Int. Cl.² .............................................. C08G 75/04
[52] U.S. Cl. .............................. 528/374; 264/176 R; 264/236; 264/331; 264/347; 427/355; 528/388
[58] Field of Search ............... 528/374, 388; 264/176, 264/236, 331, 347; 427/355

[56] References Cited
U.S. PATENT DOCUMENTS

| | | | |
|---|---|---|---|
| 3,637,612 | 1/1972 | Bertozzi | 260/18 R |
| 3,714,132 | 1/1973 | Nakanishi et al. | 528/374 |
| 3,923,754 | 12/1975 | Pellico | 528/374 |

*Primary Examiner*—Melvyn I. Marquis
*Attorney, Agent, or Firm*—Stanley A. Marcus; Royal E. Bright

[57] ABSTRACT

Inclusion of an effective amount of substantially anhydrous acetic acid in a zinc oxide cured liquid polysulfide polymer based composition results in a cured composition which is suitable for extrusion under heat and pressure and which on cooling reverts to a rubbery solid with essentially unchanged physical properties. The compositions are useful for the manufacture of sealants and extrudible goods such as hoses.

2 Claims, No Drawings

CURED POLYSULFIDE POLYMERS SUITABLE FOR HOT MELT APPLICATIONS

BACKGROUND OF THE INVENTION

This invention relates to the art of polysulfide polymers, more particularly to thiol terminated liquid polysulfide polymers and hot melt applications, such as, hot melt applied sealants, extrusion of hoses and the like.

The use of thiol terminated liquid polysulfide polymer in caulks, sealants and the like for numerous applications is well known. Such materials have normally, until now, been chemically cured in situ.

When rapid cure was desired, a two part system was necessary requiring mixing with proper equipment just before use. One part chemical cure, on the other hand, was satisfactory but required that provision be made for time for reaching structural integrity, in some uses requiring provision of storage facilities support racks and the like. In production applications, the extra space and/or equipment added a cost factor which those skilled in the art would consider it desirable to eliminate.

Hot melt applied materials offer the potential to eliminate both the two part chemical cure requirement of in situ mixing and the lengthy holding requirement of one part chemical cure.

Although polysulfide rubbers are classified with other thermoplastic materials, heating of cured polysulfide rubbers to the point at which plastic flow is possible, has always been considered by the art, as is the case for most vulcanized rubbers, to cause irreversible degradation of the polymeric chain, resulting, upon cooling, in poorer physical properties. In addition, a known degradation reaction of polysulfide polymeric chain occurs upon heating in the presence of acids. That cure of polysulfide polymers in the presence of glacial or substantially anhydrous acetic acid results in a cured polymer capable of extrusion under heat and pressure with recovery of substantially identical physical properties on cooling is unexpected.

Up until now, the available hot melt sealants, such as butyl based materials, have not exhibited good structural properties on cooling and have required cumbersome mechanical retention systems or the application of a second curable sealant where some rigidity in the sealant is necessary as in glass sandwiches for insulated windows. The present invention provides the convenience of hot melt application with the good structural properties of polysulfide rubber.

U.S. Pat. No. 3,637,612, a copy of which accompanies this application, discloses the accelerated cure of polysulfide polymer compositions using inter alia zinc oxide and aqueous acetic acid wherein the aqueous acid contains up to a 60% concentration of acetic acid. No suggestion of hot melt usage is made. Such water containing cured compositions are, in fact, not suitable for hot melt uses because steam generated at the necessary temperatures would cause a spongy non-uniform bead on extrusion.

SUMMARY OF THE INVENTION

The invention provides a cured rubber composition based on a thiol terminated liquid polysulfide polymer which comprises the reaction products of a thiol terminated liquid polysulfide polymer, zinc oxide and substantially anhydrous acetic acid.

The tangible embodiments of this composition aspect possess the inherent applied use characteristics of being extrudable under heat and pressure to form a bead which is a rubbery solid at room temperature and while in the flowable state has the ability to wet glass, aluminum, concrete, ceramic, wood and other common architectural materials, thus evidencing usefulness as a hot melt type sealant for insulating glass window sandwiches, for windows in vehicles for rail and highway travel, in the prefabrication of building components and the like.

The invention also provides a process for the preparation of a cured polysulfide rubber based on a thiol terminated liquid polysulfide polymer, said cured rubber being capable of extrusion under heat and pressure with recovery of substantially it original physical properties on cooling, which comprises:

(a) blending a thiol terminated liquid polysulfide polymer, zinc oxide and substantially anhydrous acetic acid; and (b) allowing the blend prepared in step (a) to cure.

The invention also provides a process for the preparation of an article of manufacture comprising a substrate having a cured rubber based on a thiol terminated liquid polysulfide polymer on at least one surface thereof which comprises:

(a) extruding a thiol terminated liquid polysulfide based rubber cured with zinc oxide and substantially anhydrous acetic acid under heat and pressure onto a substrate; and (b) allowing said extruded rubber of step (a) to cool and solidify.

The invention also provides a curable composition which comprises a thiol terminated liquid polysulfide polymer, zinc oxide and substantially anhydrous acetic acid.

The invention also provides an article of manufacture comprising a substrate having on at least one surface thereof a cured rubber extruded under heat and pressure which comprises the reaction products of a thiol terminated liquid polysulfide polymer, zinc oxide and substantially anhydrous acetic acid.

DESCRIPTION OF THE PREFERRED EMBODIMENT

The manner of making and using the compositions and processes of the invention will now be described with reference to a specific embodiment thereof; namely, a cured rubber (I) based on a thiol terminated liquid polysulfide polymer of the general formula:

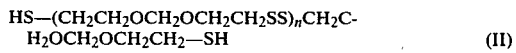

(II)

wherein n is sufficent to give an average molecular weight of about 7500 and containing about 0.5% random crosslinking introduced by incorporation of trichloropropane in the original polysulfide polymer condensation.

To prepare I, II may be blended in conventional mixing equipment, conveniently in such fashion as to avoid entrainment of air in the blend, with a curing amount of zinc oxide, conveniently from about 1.5 parts by weight (pbw) to about 10 pbw per hundred pbw liquid polysulfide polymer, preferably from about 2 pbw to about 5 pbw, and an effective amount of substantially anhydrous acetic acid, conveniently from about 0.5 pbw to about 3 pbw per hundred pbw of polysulfide polymer, preferably from about 1 pbw to about 2 pbw. The blended polymer and curing agents may then be formed into any desired shape by conventional techniques; such as, casting in a mold or extrusion as a tape. Cure may be accomplished either at room temperature or, obviously more quickly, at elevated temperatures such as about 70° C.

One skilled in the art will recognize that in addition to the thiol terminated liquid polysulfide polymer II illustrated herein above, other polysulfide polymers of the general formula:

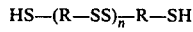

wherein n is 4 up to a value sufficient to give a molecular weight of about 10,000, which may be uncrosslinked or contain up to about 2% crosslinking and wherein R is a hydrocarbon, oxahydrocarbon or thiahydrocarbon diradical such as the ethylene radical

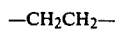

the butylene radical

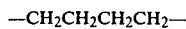

the diethylether diradical

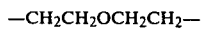

the diethylformal diradical

and the like will be suitable for the preparation of compounds of the invention.

U.S. Pat. No. 2,466,963 teaches the synthesis of this type of polymer. A number of these polymers are commercially available from Thiokol Corporation.

In the processes for the use of the compositions of the invention, their application by the use of conventional equipment is contemplated. For example, a cured ribbon of I may be extruded under heat and pressure from a heated screw-type extruder gun. Their use in replacing currently used chemically cured polymers, as well as current hot applied materials and mechanical support systems or secondarily applied chemically cured supporting compositions, are contemplated. For example, I may be extruded as above directly into edges of a channel between two pieces of window glass. Upon cooling, the unit so formed will be mechanically strong enough for further processing.

The temperatures employed for hot melt application may be those commonly employed in conventional hot melt processing; desirably they will be sufficient to cause relatively easy plastic flow from the extrusion equipment without being excessively high so as to cause obvious decomposition or reversion to a permanent liquid in a small test sample. Conveniently, these temperatures may rage from about 170° C. to about 250° C., preferably about 220° to about 240° C.

As used herein and in the appended claims, the term substantially anhydrous acetic acid comprehends the art accepted understanding of that term. Conventional commercial glacial acetic acid will normally be a typical example of such material. One skilled in the art will also recognize that for rapid cure of the compositions of the invention at room temperature, the presence of trace amounts of water will be advantageous. Such quantities of water will be substantially less than 1% and will not be present in such quantities as would make the general practitioner in the art consider the overall compositions, or any individual ingredient, to be other than substantially anhydrous.

In the use of the compositions of the invention, the optional incorporation of standard fillers, reinforcing agents, extenders, adhesive additives, flow control agents, cure rate modifiers, and the like as would normally be employed by a chemist skilled in the relevant art in preparing a formulation for a particular use is comprehended by the specification and the appended claims.

The following examples further illustrate the best mode contemplated by the inventor for the practice of his invention.

EXAMPLE I

The polysulfide polymers indicated in the table below were blended with ZnO and glacial accetic acid in the quantities indicated. After cure, the initial softening point was taken (the temperature when the polymer could be compressed slightly with a microspatula), the melt temperature (the point at which a microslide cover glass on the surface could be moved freely) and decomposition temperature (point of discoloration) determined. Samples were placed in a 200° C. oven for 15 minutes and observed for foaming, softening, discoloration and recovery of original properties. The polysulfide polymers tested were Polysulfide polymer A, II identified hereinabove; Polysulfide polymer B, 0.5% crosslinking, molecular weight about 4000, based on bis(2-chloroethyl/formal); Polysulfide polymer C, 2% crosslinking, molecular weight about 4000, based on bis(2-chloroethyl/formal).

TABLE I

| Ingredients (pbw) | | Hardness (Shore A) | Initial Soft Pt. (°C.) | Liquid Pt. (°C.) | Discolor. Flow | 200° C. Oven | | | |
|---|---|---|---|---|---|---|---|---|---|
| | | | | | | Soft & Foam | Discolor. | Prop. | Recov. Orig. |
| Polysulfide polymer A | (100) | | | | | | | | |
| Zinc oxide | (2.16) | 37 | 190 | 230 | 270 | Yes | No | Slight | Yes |
| Acetic acid | (1.44) | | | | | | | | |
| Polysulfide polymer B | (100) | | | | | | | | |
| Zinc oxide | (5.0) | | | | | | | | |
| Acetic acid | (1.0) | 42 | 170 | 245 | 245 | Yes | No | No | Yes |
| Polysulfide polymer C | (100) | | | | | | | | |
| Zinc oxide | (5.0) | 50 | 180 | 260 | 240 | Yes | No | No | Yes |
| Acetic acid | (1.0) | | | | | | | | |

The subject matter which applicant regards as his invention is particularly pointed out and distinctly claimed as follows:

1. A process for the preparation of a cured polysulfide rubber based on a thiol terminated liquid polysulfide polymer, said cured rubber being capable of extrusion under heat and pressure with recovery of substantially its original physical properties, which comprises:
   (a) blending a thiol terminated liquid polysulfide polymer, zinc oxide and substantially anhydrous acetic acid; and
   (b) allowing the blend prepared in step (a) to cure to a solid.

2. A process for the preparation of an article of manufacture comprising a substrate having a cured rubber based on a thiol terminated liquid polysulfide on at least one surface thereof which comprises:
   (a) extruding a thiol terminated liquid polysulfide polymer based rubber cured with zinc oxide and substantially anhydrous acetic acid under heat and pressure onto a substrate; and
   (b) allowing said extruded rubber of step (a) to cool and solidify.

* * * * *

UNITED STATES PATENT OFFICE
CERTIFICATE OF CORRECTION

Patent No. 4192941  Dated March 11, 1980

Inventor(s) Eugene R. Bertozzi

It is certified that error appears in the above-identified patent and that said Letters Patent are hereby corrected as shown below:

Column 6, line 3, after the word "polysulfide" insert
--polymer--

Column 2, line 16, "it" should read --its--

Column 4, Table I, the heading "Discolor Flow" should read
--Discolor--
   (°C)

the heading "Soft & Foam" should read
Soft
-- & --
Flow the heading "Discolor" should read --Foam-- the heading "Prop." should read --Discolor-- the heading "Recov. Orig." should read
Recov.
-- Orig.--
Prop.

Signed and Sealed this

Twenty-ninth Day of December 1981

[SEAL]

Attest:

GERALD J. MOSSINGHOFF

Attesting Officer   Commissioner of Patents and Trademarks